Dec. 7, 1965 R. A. THORPE 3,222,528

MULTI-STATE PHOTOCONDUCTIVE LOGIC CIRCUITS

Filed Nov. 2, 1961 2 Sheets-Sheet 1

INVENTOR
ROBERT A. THORPE

BY Curtis Ailes Jr.
ATTORNEY

| | | INPUT A | | |
|---|---|---|---|---|
| | | -2V | 0 | +2V |
| INPUT B | -2V | -2V | -2V | -2V |
| | 0 | -2V | 0 | 0 |
| | +2V | -2V | 0 | +2V |

United States Patent Office 3,222,528
Patented Dec. 7, 1965

3,222,528
MULTI-STATE PHOTOCONDUCTIVE LOGIC CIRCUITS

Robert A. Thorpe, Peekskill, N.Y., assignor to International Business Machines Corporation, New York, N.Y., a corporation of New York Filed Nov. 2, 1961, Ser. No. 149,694
6 Claims. (Cl. 250—209)

This invention relates to logical circuit arrangements which are responsive to each of three different input signal conditions.

In communications circuits and also in logical circuits for data processing apparatus it has been known that it is possible to transmit a large number of different signals over a single circuit by employing apparatus which is responsive to different voltage levels or different frequencies. However, in logical circuits employed in data processing equipment, in order to simplify the apparatus and in order to promote reliability, it has often been the practice to rely on only two signal conditions for the representation of binary information. These two conditions are often simply the presence of a signal voltage and the absence of a signal voltage which may respectively signify binary "1" and binary "0."

However, it is obviously desirable for many purposes to be able to transmit more than a single binary signal over each signal circuit.

Accordingly, it is an important object of the present invention to provide a logical circuit arrangement which is capable of responding to three different input signal conditions and which is nevertheless very simple and reliable.

In complex data processing equipment, a tremendous number of circuit interconnections are required and these interconnections entail electrical losses and require considerable space.

Accordingly, another important object of the present invention is to reduce the number of required circuit interconnections within the data processing apparatus without reducing the capabilities thereof.

In carrying out the above objects of this invention in one preferred embodiment thereof, a logical circuit arrangement is provided for producing different optical light outputs in response to different input voltage conditions at a single input terminal. The circuit includes two symmetrical voltage responsive light sources connected in series, the series combination being arranged for connection between two different direct current bias voltage levels, and the intermediate connection between the light sources being connected and arranged to receive direct current input voltage signal conditions. One of the input signal conditions constitutes a first input voltage level intermediate in value to said bias voltage levels and two other input signals conditions constituting second and third input voltage levels above and below the first input voltage level. The lamps are respectively operable to produce an optical output whenever the second and third input voltage levels exist, the lamp having a bias voltage below the first input voltage level being operable in response to the second input, and the lamp having a bias voltage above the first input voltage level being operable in response to the third input.

For a more complete understanding of the invention and for an appreciation of other objects and advantages thereof attention is directed to the following specification and the accompanying drawings which are briefly described as follows.

Figures 4, 5:
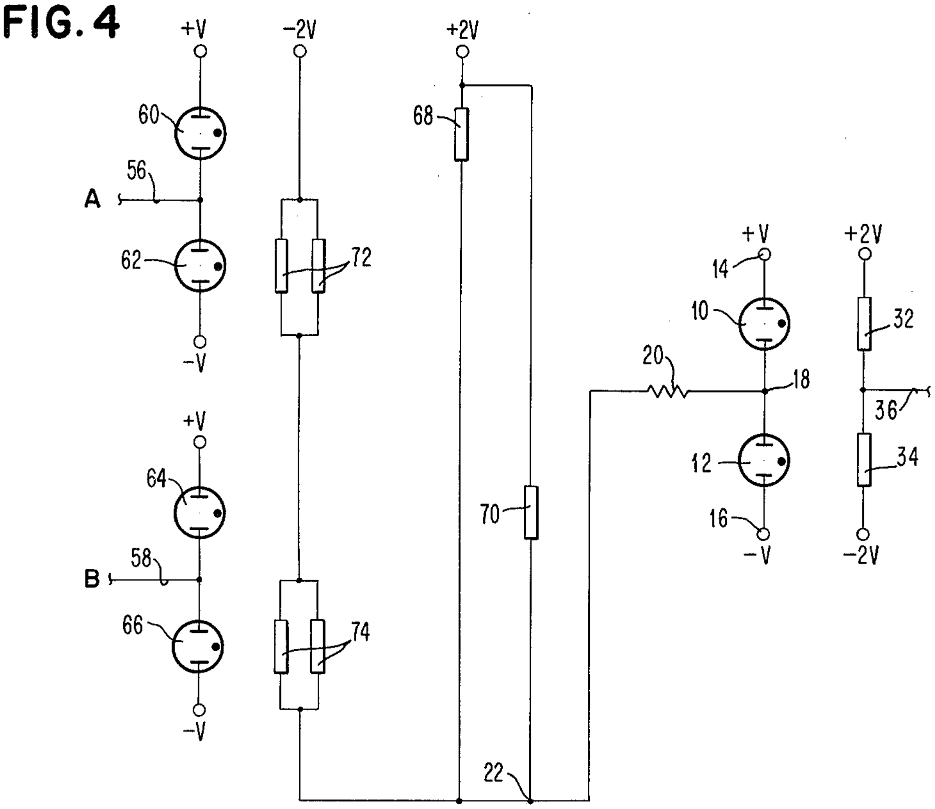
FIG. 4 is a further modification of the photologic embodiment connected and arranged to provide logical functions of two different input variables.

And FIG. 5 is a truth table illustrating the operation of FIG. 5.

Figure 1:
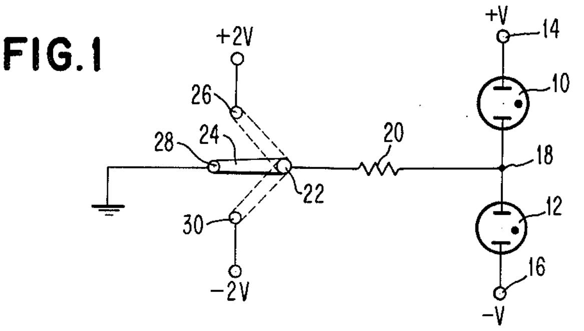
FIG. 1 is a schematic circuit diagram showing an elementary form of the present invention.

Referring more particularly to FIG. 1, there are shown two symmetrical non-linear impedance devices in the form of neon glow lamps 10 and 12 which are connected in series between two different direct current bias voltage levels respectively signified at terminals 14 and 16 by the voltage symbols +V and −V. The common intermediate connection 18 of said devices is connected through a common impedance 20 to form an input terminal 22. Terminal 22 is arranged, as indicated by a switch element 24, for connection to any one of three different voltage levels. These voltage levels are indicated at switch contact terminals 26, 28, and 30 respectively as +2V, ground, and −2V.

The voltage V is such that the firing voltage of either of the individual neon glow lamps 10 and 12 is greater than 2V but less than 3V. Accordingly, when the input voltage at 22 is zero (when the switch lever 24 is connected to the ground terminal 28) neither of lamps 10 nor 12 is on. However, if the input is changed to +2V by changing the connection of the switch 24 to terminal 26, then the total potential across lamp 10 is V and the total potential across lamp 12 is 3V. Lamp 12 is thus switched on to cause illumination thereof. Resistor 20 functions to limit the current through the lamp 12. If the input voltage of 22 is again changed, such as by moving switch 24 back to the ground terminal 28, the voltage across lamp 12 will no longer be sufficient to maintain illumination thereof. If the voltage at input terminal 22 is changed to −2V by moving the switch 24 to the switch contact 30, then the total voltage across lamp 10 will be 3V so as to cause illumination of lamp 10.

Thus, the circuit of FIG. 1 is responsive to three different input voltage conditions. For a 0 input, neither of the lamps 10 nor 12 is illuminated. With an input of +2V, only lamp 12 is illuminated, and with an input of −2V, only lamp 10 is illuminated. The lamps thus provide a visual optical output. Such an output may be detected by further circuitry which may be responsive to the change in current in the circuit branch containing the lamp which is illuminated, or the optical output may be detected by photoresponsive devices arranged for illumination by the lamps. Such devices may be those commonly referred to as photoconductors.

Figure 2:
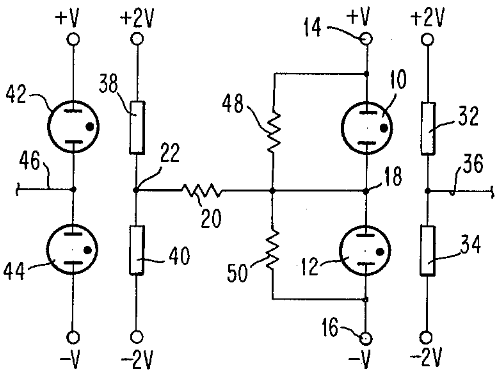
FIG. 2 is a schematic circuit diagram showing a photologic embodiment of the present invention.

In the embodiment of FIG. 2, photoconductors 32 and 34 are actually shown arranged respectively to receive illumination from lamps 10 and 12 and to transmit electrical signals in response to such illumination. In FIG. 2 and the succeeding figures, the small rectangular symbols such as are used for photoconductors 32 and 34 signify devices which have photoresponsive properties which are commonly referred to as photoconductors. Since they are devices which have a lowered impedance when they are illuminated, they are more accurately described as photoresponsive impedance devices, but the popular "photoconductor" term is used in this specification. The preferred photoconductor devices will be described more fully below. Throughout the drawing the convention is followed that each photoconductor device is to be illuminated only by the first lamp positioned to the left of that photoconductor in the drawing.

In FIG. 2, at the common connection 36 of the photoconductors 32 and 34, an output signal is provided which is analogous to the input signal at input connection 22 of FIG. 1. At input connection 22 of FIG. 2, a similar photoconductor switching control is shown in connection with photoconductors 38 and 40 which are respectively arranged for illumination by input control lamps 42 and 44. These lamps may be controlled by a voltage at their common input connection 46. Thus, it is to be seen that in the embodiment of FIG. 2 the circuit of the present invention may have a photologic input as well as a photologic output. It is apparent that another lamp circuit including a pair of lamps such as 10 and 12 could be connected to receive and respond to the signal at output terminal 36 and a photologic output from those lamps could in turn be connected to operate still another pair of lamps. Thus, in accordance with the present invention, a series of cascade connected lamp and photoconductor circuits may be employed to build up a system. Such cascade connections are also possible with the embodiments of FIGS. 3 and 4 which will be described below.

The circuit of FIG. 2 may be regarded as an inverter circuit because a positive voltage input at terminal 22, by reason of illumination of photoconductor 38, will result in a negative output voltage at output terminal 36. This is true because a positive voltage at terminal 22 causes illumination of lamp 12 and a low impedance of photoconductor 34 to connect −2V to the output terminal 36.

Each of the lamps 10 and 12 has a resistor connected in shunt therewith as respectively indicated at 48 and 50. These shunt resistors may be of high resistance value such as one megohm and they improve the reliability of the circuit by forming a voltage divider network to prevent undesirable voltage swings across the lamp under 0 input and transient conditions. While not shown on the other figures, it will be understood that these shunt resistors may be advantageously used with each of the other embodiments.

Figure 3:
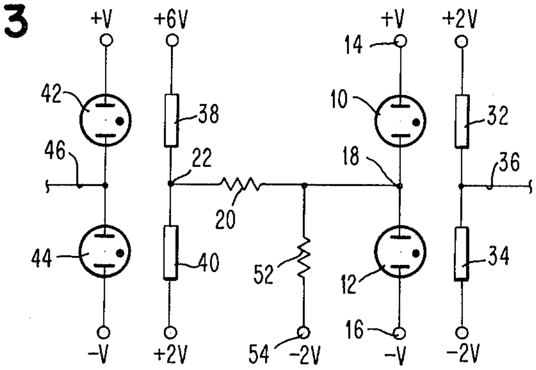
FIG. 3 is a schematic circuit diagram showing a modification of the photologic embodiment of FIG. 2 which is capable of providing a different logical output.

FIG. 3 represents a modification of the system of FIG. 2. The main difference in the system of FIG. 3 resides in the addition of a new input voltage circuit to point 18 provided through a resistor 52 from a terminal 54 which is arranged to be provided with the voltage −2V. In addition, the voltage applied to photoconductor 40 is changed to +2V and the voltage applied to photoconductor 38 is +6V. The resistor 52 is chosen to have a resistance value equal to the sum of the resistance of the current limiting resistor 20 plus the illuminated resistance of either one of the photoconductor 38 or 40.

In the operation of the system of FIG. 3, if there is no input at 46 and neither of the photoconductors 38 or 40 is illuminated, the voltage applied through resistor 52 is sufficient to energize lamp 10 and to provide a positive voltage output at output connection 36. If the input at 46 is positive, causing illumination of lamp 44, then the photoconductor 40 plus the current limiting resistor 20 forms a voltage divider with the resistor 52 resulting in substantially 0 voltage at the interconnection 18 between lamps 10 and 12. Thus, under these circumstances there is a 0 voltage output at 36. However, if the input voltage at 46 is negative, causing illumination of photoconductor 38 by lamp 42, then the voltage division through photoconductor 38 and resistor 20 and resistor 52 is such as to result in approximately +2V volts at interconnection 18 causing illumination of lamp 12 and a resultant negative voltage output at output connection 36. When viewed as a ternary logic circuit, the logical function provided by this circuit may be described as a "rotation" or a "shift."

It will be recognized that the circuits of FIGS. 1, 2, and 3 are adapted to deal with three input signal values. These three input signal values may be viewed in several different ways. For instance, a plus voltage input may be regarded as a 1 value, or a first binary signal, a negative voltage may be regarded as a 1 value, or a second binary signal, and a 0 voltage input may be regarded as 0 value for both binary signals. Another useful coding of these three signals would be to recognize a plus voltage as a binary 1, a negative voltage as a binary 0, and a 0 voltage as an error check signal. The circuits may also be regarded as representing ternary or three state logic circuits in which a negative input might indicate 0, a zero voltage might indicate a 1, and a positive voltage might indicate a value of 2.

A further embodiment of the present invention which is capable of responding to two 3-valued inputs is illustrated in FIG. 4. The circuit is arranged to receive the two inputs, which may be respectively identified as A and B, at input connections 56 and 58 to respectively control the operation of pairs of glow lamps identified at 60, 62, 64, and 66. The resultant output appears at output connection 36. The components associated with output connection 36, including photoconductors 32 and 34 and lamps 10 and 12, are arranged in a manner similar to the corresponding components of the prior embodiments and are similarly lettered. In FIG. 4, the terminal 22 is controlled through a photologic OR circuit including photoconductors 68 and 70 to provide a +2V voltage, or through a photologic AND circuit including photoconductors 72 and 74 to provide a −2V voltage. The voltage at 22 may be referred to hereinafter as an intermediate output signal.

FIG. 5 is a truth table to represent the operation of FIG. 4 showing the output voltage appearing at output 36 in response to various combinations of the A and B inputs. In this table, the A inputs are specified by columns and the B inputs are specified by rows.

By analogy to the operation of the previous embodiments as described above, it is clear that in order for the circuit branch including photoconductors 72 and 74 to be effective, a positive input must be available at both A and B to illuminate lamps 62 and 66. The resultant negative voltage at terminal 22 results in illumination of lamp 10 and a positive output voltage at 36 provided through photoconductor 32. If either the A or the B input is negative, the resultant illumination of either lamp 60 or lamp 64 provides a completion of a photologic circuit through either photoconductor 68 or 70 to provide a positive voltage at terminal 22, lighting glow lamp 12 and providing a negative output at 36 through photoconductor 34. If both A and B inputs are 0, it is obvious that no lamps are illuminated and the output at 36 is accordingly 0.

The circuit of FIG. 4 may be described as representing a "minimum" function since the output voltage is always equal to the lowest valued of the input function voltages. This circuit of FIG. 4 may be easily modified to provide a function which can be described as the "maximum" function by simply reversinng the polarities of the bias voltages applied at the lamps 60, 62, 64, and 66 and by reversing the polarities of the voltages applied to the associated photoconductor circuits including photoconductors 68, 70, 72, and 74. Similarly, the inverse of either of these functions may be obtained by simply reversing the polarities of the bias voltages applied to lamps 10 and 12.

Although the photoresponsive devices as illustrated in the embodiments of this invention are referred to as "photoconductors" it should be emphasized that devices of this description are really more accurately described as impedances which achieve a substantially reduced impedance value when they are illuminated. Thus, it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance; having photoresponsive properties. However, the term "photoconductor" and the like is used in this specification, keeping these qualifications in mind. In the description of the circuit, for convenience, circuit paths are often described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York City, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE–2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a range in the order of 80 to 100 volts. The current required for such a neon lamp may vary from one-third of a milliampere to one milliampere.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

In the embodiments of the present invention shown in the drawings, if the above mentioned photoconductors and neon glow lamps are employed, a suitable voltage value for V is 45 volts. Thus, 2V is 90 volts and 6V is 270 volts. It will be appreciated that the voltages given on the circuit diagrams are arbitrarily related to a "0" or "ground" reference point. It will be obvious that a different reference level could be used to signify a 0 input. For instance, the 0 input reference level could be chosen as +2V and the proper voltages for the entire circuit would then be derived by algebraic addition of the value +2V to each voltage. In any case, the voltages may be supplied from conventional voltage sources (not shown).

Other appropriate typical circuit constants are as follows: a suitable resistance value for the current limiting resistor 20 is 70,000 ohms and a suitable resistance value for resistor 52 in FIG. 3 is 120,000 ohms. It will be understood that the above values for specific circuit constants are supplied merely for the purpose of completing the disclosure of specific illustrative embodiments of the invention and are not intended to limit the scope of the invention.

While the invention has been particularly shown and described with reference to preferred embodiments thereof, it will be understood by those skilled in the art that various changes in form and details may be made therein without departing from the spirit and scope of the invention.

What is claimed is:

1. A logical circuit arrangement for producing different outputs in response to different input voltage levels at a single input terminal comprising in combination:

first and second negative impedance voltage responsive light sources for producing an optical output in response to said input voltage levels;

means for connecting said light sources in series, said means including an intermediate connection between said light sources;

a first bias voltage source for providing a first direct current bias voltage level to said first light source;

means for connecting said first bias voltage source to said first light source;

a second bias voltage source for providing a second direct current bias voltage level to said second light source, said second direct current bias voltage level being equal in magnitude but opposite in polarity to said first direct current bias voltage level;

means for connecting said second bias voltage source to said second light source;

means for providing a first input voltage level having a zero magnitude;

means for providing a second input voltage level having a positive polarity in relation to said first input voltage level;

means for providing a third input voltage level having a negative polarity in relation to said first input voltage level;

means for connecting said second input voltage level to said intermediate connection and energizing said second light source;

means for connecting said third input voltage level to said intermediate connection and energizing said first light source; and a first and second photoresponsive device for providing electrical output signals, said first photoresponsive device being positioned to be operable in response to illumination from said second light source and said second photoresponsive device being positioned to be operable in response to illumination from said first light source.

2. A logical circuit arrangement for producing different optical light outputs in response to different input voltage levels at a single input terminal comprising in combination:

first and second negative impedance voltage responsive light sources for producing an optical output in response to said input voltage levels;

means for connecting said light sources in series, said means including an intermediate connection between said light sources;

a first bias voltage source for providing a first direct current bias voltage level to said first light source, said first bias voltage level being above a first input voltage level;

means for connecting said first bias voltage source to said first light source;

a second bias voltage source for providing a second direct current bias voltage level to said second light source, said second bias voltage level being below said first input voltage level;

means for connecting said second bias voltage source to said second light source;

first input circuit means comprising an impedance and a first voltage source for providing a third input voltage level less than said first input voltage level;

second input circuit means comprising a second voltage source, a first photoconductor and first means for illuminating said first photoconductor, said second circuit means being connected to said first circuit means and operable therewith as a voltage divider in response to illumination of said first photoconductor for providing said first input voltage level, said first input voltage level having a zero magnitude;

third input circuit means comprising a third voltage source, a second photoconductor and second means for illuminating said second photoconductor, said third input circuit means being connected to said first input circuit means and operable therewith as a voltage divider in response to illumination of said second photoconductor for providing said second input voltage level greater than said first input voltage level;

means for connecting said second input voltage level to said intermediate connection and energizing said second light source; and means for connecting said third input voltage level to said intermediate connection and energizing said first light source.

3. A logical circuit arrangement for producing different outputs in response to different input voltage levels at a single input terminal comprising in combination:

first and second negative impedance voltage responsive light sources for producing an optical output in response to said input voltage levels;

means for connecting said light sources in series, said means including an intermediate connection between said light sources;

a first bias voltage source for providing a first direct current bias voltage level to said first light source, said first direct current bias voltage level being above a first input voltage level;

means for connecting said first bias voltage source to said first light source;

a second bias voltage source for providing a second direct current bias voltage level to said second light source, said second direct current bias voltage level being below said first input voltage level;

means for connecting said second bias voltage source to said second light source;

means for providing said first input voltage level, said first input voltage level being intermediate in value to said first and second bias voltage levels;

means for providing a second input voltage level to said single input terminal, said second input voltage level being greater than said first input voltage level, said last-mentioned means comprising a third bias voltage source for providing a third direct current bias voltage level greater than said first direct current bias voltage level, a third light source for providing illumination, and a photoconductor responsive to said third direct current bias voltage level and illumination from said third light source;

means for providing a third input voltage level to said single input terminal, said third input voltage level being less than said first input voltage level, said last-mentioned means comprising a fourth bias voltage source for providing a fourth direct current bias voltage level less than said third direct current bias voltage level, a fourth light source for providing illumination, and a fourth photoconductor responsive to both illumination from said fourth light source and said fourth bias voltage source;

means for connecting said second input voltage level to said intermediate connection and energizing said second light source; and means for connecting said third input voltage level to said intermediate connection and energizing said first light source.

4. A logical circuit system for producing different outputs in response to different input voltage levels comprising in combination:

first circuit means for producing electrical output signals and including at least the following elements;

first and second negative impedance voltage responsive light sources for producing an optical output in response to said input voltage levels;

means for connecting said light sources in series, said means including an intermediate connection between said light sources;

a first bias voltage source for providing a first direct current bias voltage level to said first light source;

means for connecting said first bias voltage source to said first light source;

a second bias voltage source for providing a second direct current bias voltage level to said second light source, said second direct current bias voltage level being equal in magnitude but opposite in polarity to said first direct current bias voltage level;

means for connecting said second bias voltage source to said second light source;

means for providing a first input voltage level having a zero magnitude;

means for providing a second input voltage level having a positive polarity in relation to said first input voltage level;

means for providing a third input voltage level having a negative polarity in relation to said first input voltage level;

means for conecting said second input voltage level to said intermediate connection and energizing said second light source;

means for connecting said third input voltage level to said intermediate connection and energizing said first light source;

a first and second photoresponsive device for providing electrical output signals, said first photoresponsive device being positioned to be operable in response to illumination from said second light source said said second photoresponsive device being positioned to be operable in response to illumination from said first light source; and a second circuit means having components identical in number and connection to said first circuit; and means for connecting said first and second photoresponsive devices of said first circuit means to the means for providing a first input voltage level, means for providing a second input voltage level and means for providing a third input voltage level of said second circuit means.

5. A logical system as defined in claim 4 and further comprising N electrical circuit means, wherein there are 1 to $(N-1)$ said electrical circuit means each consisting of said first and second electrical circuit means, and the said N electrical circuit means consists of the said elements included in the said first electrical circuit means.

6. A logical circuit apparatus comprising in combination:

a plurality of three state circuits for providing output signals, each of said three state circuits including first and second voltage responsive light sources for producing an optical output in response to input voltage levels;

means for connecting said light sources in series, said means including an intermediate connection between said light sources;

a first bias voltage source for providing a first direct current bias voltage level to said first light source;

means for connecting said first bias voltage source to said first light source;

a second bias voltage source for providing a second direct current bias voltage level to said second light source;

means for connecting said second bias voltage source to said second light source;

means for providing a first input voltage level intermediate in value to said first and second bias voltage levels;

means for providing a second input voltage level greater than said first input voltage level;

means for providing a third input voltage level less than said first input voltage level;

means for connecting said second input voltage level to said intermediate connection and energizing said second light source;

means for connecting said third input voltage level to said intermediate connection and energizing said first light source;

a plurality of photoconductors being positioned to be responsive to illumination from said three state circuits for providing a low impedance path for current flow;

a bias voltage source for providing bias voltage levels to said photoconductors;

means for connecting said bias voltage sources to said photoconductors;

an output terminal for conveying current from said photoconductors, said current representing logical functions of various combinations of input signals;

means for connecting said output terminal to said photoconductors; and means for connecting an input terminal of at least one of said three state circuits to said output terminal.

References Cited by the Examiner

UNITED STATES PATENTS

| | | | |
|---|---|---|---|
| 2,848,685 | 8/1958 | Mondschein | 328—210 |
| 2,901,641 | 8/1959 | Wolf | 307—88.5 |
| 3,040,178 | 6/1962 | Lyman et al. | 307—88.5 |
| 3,050,633 | 8/1962 | Loebner | 250—209 |

OTHER REFERENCES

Bryson, I.B.M. Technical Disclosure Bulletin, volume 4, No. 2, July 1961, page 50.

RALPH G. NILSON, *Primary Examiner.*

GEORGE N. WESTBY, *Examiner.*